(12) United States Patent
Mitchner

(10) Patent No.: US 9,207,423 B2
(45) Date of Patent: Dec. 8, 2015

(54) REPAIRABLE FIBER OPTIC CABLE

(71) Applicant: Ximedix, Inc., Colorado Springs, CO (US)

(72) Inventor: Robert K. Mitchner, Longmont, CO (US)

(73) Assignee: Ximedix, Inc., Colorado Springs, CO (US)

(*) Notice: Subject to any disclaimer, the term of this patent is extended or adjusted under 35 U.S.C. 154(b) by 284 days.

(21) Appl. No.: 13/833,943

(22) Filed: Mar. 15, 2013

(65) Prior Publication Data

US 2014/0056567 A1 Feb. 27, 2014

Related U.S. Application Data

(60) Provisional application No. 61/614,366, filed on Mar. 22, 2012, provisional application No. 61/665,167, filed on Jun. 27, 2012.

(51) Int. Cl.
  *G02B 6/36* (2006.01)
  *G02B 6/44* (2006.01)
  *G02B 6/38* (2006.01)

(52) U.S. Cl.
  CPC ............ *G02B 6/4467* (2013.01); *G02B 6/3809* (2013.01); *G02B 6/3816* (2013.01); *G02B 6/3858* (2013.01); *G02B 6/3869* (2013.01); *Y10T 29/49718* (2015.01)

(58) Field of Classification Search
  CPC .. G02B 6/4467; G02B 6/3806; G02B 6/3851; G02B 6/241; G02B 6/38; G02B 6/3831; G02B 6/24; G02B 6/3809

USPC ...................................................... 385/66, 68
See application file for complete search history.

(56) References Cited

U.S. PATENT DOCUMENTS

| | | | |
|---|---|---|---|
| 3,902,785 A * | 9/1975 | Matthews ........................ | 385/68 |
| 4,785,805 A | 11/1988 | Joffe et al. | |
| 4,834,489 A * | 5/1989 | Betzler et al. ................... | 385/69 |
| 5,228,104 A | 7/1993 | Desmons | |
| 5,452,391 A | 9/1995 | Chou et al. | |
| 5,495,755 A | 3/1996 | Moore | |
| 6,312,163 B1 * | 11/2001 | Ono et al. ....................... | 385/70 |
| 6,496,625 B1 | 12/2002 | Falkowich | |
| 6,839,494 B2 | 1/2005 | Clatanoff et al. | |
| 7,310,470 B2 | 12/2007 | Ray et al. | |
| 7,410,308 B2 | 8/2008 | Qian et al. | |

(Continued)

FOREIGN PATENT DOCUMENTS

JP       2004/170888       6/2004

OTHER PUBLICATIONS

PCT/US2013/033135; filed Mar. 20, 2013; Enroxtech, Inc.; International Search Report dated Jul. 15, 2013.

*Primary Examiner* — Rhonda Peace
(74) *Attorney, Agent, or Firm* — Thorpe North & Western, LLP

(57) ABSTRACT

A repairable fiber optic cable is disclosed. The repairable fiber optic cable can include an outer protective housing, a connector associated with the outer protective housing, and a fiber optic core removably disposed in the outer protective housing. The fiber optic core can have an optical fiber and an insert coupled about an end of the optical fiber. An attachment feature of the connector can be operable with an attachment feature of the insert to facilitate removable coupling of the insert with the connector.

18 Claims, 4 Drawing Sheets

(56) References Cited

U.S. PATENT DOCUMENTS

| | | |
|---|---|---|
| 7,641,395 B2 * | 1/2010 | Ringgenberg et al. .......... 385/53 |
| 7,986,861 B2 * | 7/2011 | Shimotsu ........................ 385/33 |
| 2002/0150376 A1 | 10/2002 | Lutzen et al. |
| 2004/0047566 A1 | 3/2004 | McDonald et al. |
| 2005/0192479 A1 | 9/2005 | Forster et al. |
| 2005/0281511 A1 * | 12/2005 | Ringgenberg et al. .......... 385/70 |
| 2006/0177182 A1 * | 8/2006 | Mine et al. ...................... 385/74 |
| 2007/0196053 A1 * | 8/2007 | Kewitsch ........................ 385/74 |
| 2010/0329609 A1 * | 12/2010 | Shimotsu ........................ 385/50 |
| 2010/0331626 A1 | 12/2010 | Shimotsu |
| 2014/0056567 A1 * | 2/2014 | Mitchner ...................... 385/134 |

* cited by examiner

REPAIRABLE FIBER OPTIC CABLE

BACKGROUND

A fiber optic cable may be used to transmit light from a light source to an instrument, such as an endoscope. Typical fiber optic cables comprise rigid or fixed assemblies requiring trained and skilled personnel for repair or service. The primary failure mode of fiber optic cables is breakage of enough light transmitting fiber optic fibers to lower the light transmission to below a specified or acceptable level. At that point the cable is typically sent to a repair facility or discarded and replaced. If repaired, and as most users of fiber optic cables are not equipped to repair a fiber optic cable, the cable is usually sent off-site to a specialized repair service having the expertise to disassemble the fiber optic cable and replace the light transmitting portion. Although often less expensive than replacing the fiber optic cable altogether, such repair methods can still create significant costs, as well as causing delays.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

A repairable fiber optic cable is disclosed that allows users, such as hospital personnel, to repair or refurbish fiber optic cables without the use of specialized equipment. The repairable fiber optic cable can comprise a removable fiber optic core (containing the fiber optic fibers that typically break or fail) that allows users to stock one or more replacement fiber optic cores designed to be interchanged with a broken or defective fiber optic core, wherein the fiber optic core is operable with an outer protective housing, to comprise the repairable fiber optic cable. By being able to repair a fiber optic cable on-site as needed, the problems and difficulties associated with prior related fiber optic cables and conventional repair methods are largely overcome.

Figure 1:
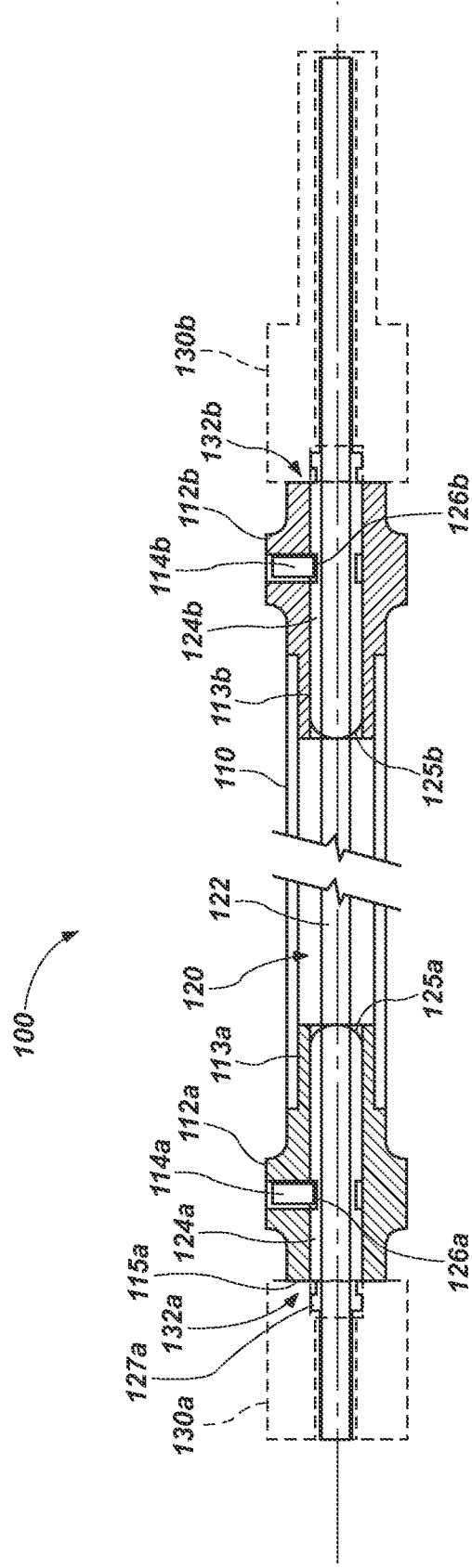
FIG. 1 is an example illustration of a repairable fiber optic cable in accordance with an embodiment of the present invention.

One embodiment of a repairable fiber optic cable 100 is illustrated in FIG. 1. The repairable fiber optic cable 100 can comprise an outer protective housing 110 and one or more connectors (e.g., see connectors 112a, 112b) associated with the outer protective housing 110. In one aspect, to facilitate coupling, the connectors 112a, 112b can include a flange 113a, 113b, respectively, that can be inserted into the outer protective housing 110. The outer protective housing 110 can be constructed of any suitable material, for example silicone. The connectors 112a, 112b can be made of any suitable material, such as a metal or a plastic. A fiber optic core 120 can be removably disposed in the outer protective housing 110. For example, the fiber optic core 120 can be slidably inserted into and/or removed from the protective housing 110.

Figure 2:
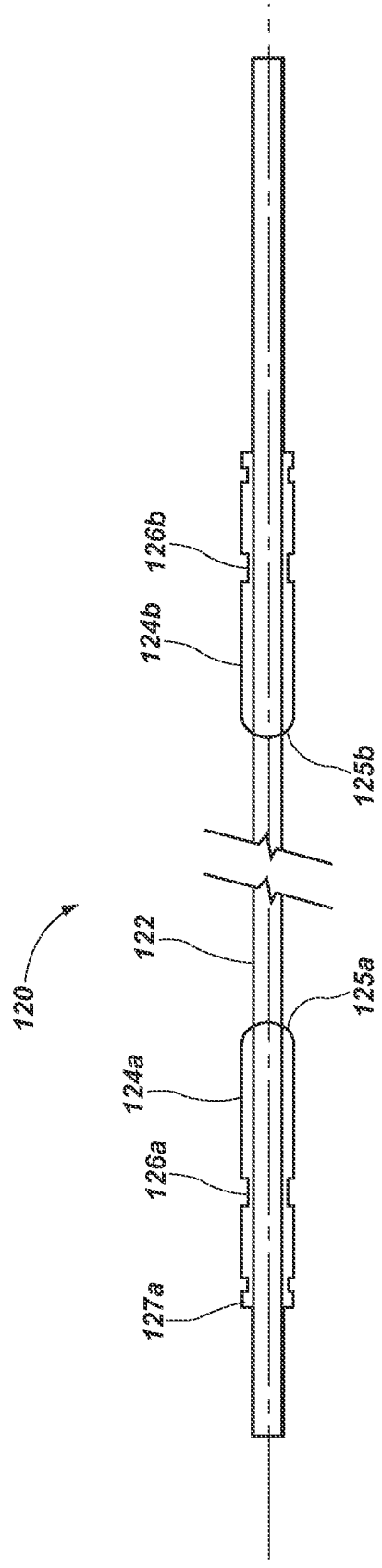
FIG. 2 is an illustration of a fiber optic core of the repairable fiber optic cable of FIG. 1.

FIG. 2 illustrates the fiber optic core 120 of FIG. 1 with the outer protective housing 110 and the connectors 112a, 112b omitted for clarity. The fiber optic core 120 can comprise an optical fiber 122 and one or more inserts (e.g., see inserts 124a, 124b) coupled to or otherwise supported about the optical fiber 122, for example about the ends of the optical fiber. In one aspect, the optical fiber 122 can comprise a plurality of optical fibers, such as a bundle of optical fibers. The inserts 124a, 124b can be made of any suitable material, such as a metal or a plastic.

With continued reference to FIGS. 1 and 2, an attachment feature of the connectors (e.g., see attachment features 114a, 114b of the connectors 112a, 112b, respectively) can be operable with an attachment feature of the inserts 124a, 124b (e.g., see attachment features 126a, 126b, respectively) to facilitate removable coupling of the inserts 124a, 124b with the connectors 112a, 112b. In one aspect, the attachment features 114a, 114b of the connectors 112a, 112b comprises a fastener, such as a set screw, a pin, a key, or combinations thereof. In another aspect, the attachment features 126a, 126b of the inserts 124a, 124b comprise at least one of a slot, a hole, a keyway, a groove, a channel, and a depression formed in an outer surface of the inserts 124a, 124b to facilitate removably coupling with the connectors 112a, 112b, respectively. Thus, the respective attachment features of the connectors and the inserts can be configured to operate together to secure the inserts to the connectors.

As illustrated in the figures, inserts 124a, 124b can be coupled about opposite ends of the optical fiber 122. In one aspect, an orientation of insert 124b can be opposite an orientation of insert 124a along the optical fiber 122. In addition, a transition surface can be formed about one or more ends of the inserts 124a, 124b to ease insertion into, or removal from, the outer protective housing 110, and the connector 112a, 112b. The transition surface can function to reduce counter-opposing forces between the inserts and the protective housing and connectors as an incident angle (the angle of the tangent line or the angle of the surface about the insert at the point of contact (e.g., by the connector) is provided between these that is not orthogonal or that is less than orthogonal to a longitudinal axis of the insert, which angle helps to reduce contact and interaction forces and friction between the inserts as they are caused to move relative to the protective housing and the connectors. For example, transition surfaces 125a, 125b formed in opposing ends of the inserts 124a and 124b, respectively, can aid in sliding the inserts 124a, 124b past the connectors 112a, 112b as the optical fiber core is inserted or removed from the protective housing 110. Moreover, transition surfaces 125a, 125b can function to help guide the inserts into or out of the connectors 112a, 112b by providing a surface over which an engaging surface of the connectors can slide. The transition surfaces can be configured to comprise a round, chamfer, or other suitable surface configuration to reduce a likelihood of the insert becoming caught or snagged on a connector while being inserted into the protective housing 110. As shown, the transition surfaces 125a, 125b can comprise a round. However, those skilled in the art will recognize that other configurations are possible, and as such, the specific transition surface configurations discussed herein are not intended to be limiting in any way. It is also noted that, in some exemplary embodiments, to assist in inserting or removing the fiber optic core 120 from the protective housing 110, the inserts 124a, 124b can be permanently attached to the optical fiber 120, such as with an adhesive or interference fit.

As illustrated in FIG. 1, a portion of the inserts 124a, 124b can be configured to couple with an adapter 130a, 130b for a fiber optic device (not shown). In one aspect, the connectors 112a, 112b can operate cooperatively with the inserts 124a, 124b to form interfaces 132a, 132b, respectively, for the adapters 130a, 130b for coupling to an optical device. For example, a portion of the insert 124a can extend beyond the connector 112a to expose an adapter interface feature for coupling with the adapter 130a. In particular, a portion of the insert 124a can comprise a threaded interface 127a configured to couple with an adapter 130a for a fiber optic device. In addition, upon threading the adapter 130a to the insert 124a, the adapter 130a can be configured to contact an end 115a of the connector 112a.

Figure 3:
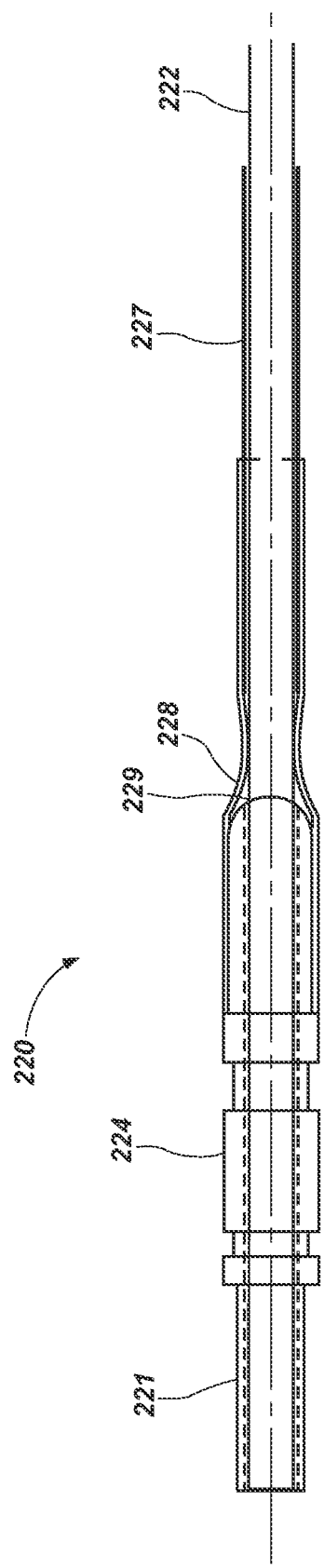
FIG. 3 is an example illustration of a repairable fiber optic cable in accordance with an embodiment of the present invention.

With reference to FIG. 3, illustrated is a fiber optic core 220 in accordance with another exemplary embodiment of the present disclosure. In general, the fiber optic core 220 can include many of the same features as the fiber optic core 120 illustrated in FIGS. 1 and 2, and discussed above, such as an optical fiber 222 and an insert 224. In one aspect, the fiber optic core 220 can also include a protective sleeve 227 disposed over the optical fiber 222. The protective sleeve 227 can protect the optical fiber 222 when it is being handled and shipped and can also facilitate sliding or inserting of the fiber optic core 220 inside an outer protective housing, such as described above. The protective sleeve 227 can be disposed over a portion of the optical fiber 222 or the protective sleeve 227 can be disposed over substantially an entire length of the optical fiber 222. In one exemplary embodiment, the protective sleeve 227 can comprise a mesh configuration, wherein longitudinal compression of the mesh causes a diameter of the protective sleeve 227 to increase, thereby facilitating insertion of the optical fiber 222 into the protective sleeve 227. A protective sleeve 227 can be constructed of any suitable material, such as PTFE or other suitable polymers.

The fiber optic core 220 can also include a strain relief component 228 disposed over a junction 229 between the optical fiber 222 and the insert 224. In addition to providing a strain relief function for the optical fiber 222 at the junction 229, the strain relief component 228 can also serve to couple the protective sleeve 227 to the insert 224. In one aspect, the strain relief component 228 can comprise a shrink tube. The strain relief component 228 can be constructed of any suitable material, such as polyolefin, PTFE, or other suitable polymers.

The insert 224 can include a casing 221 disposed about an end of the optical fiber 222. The casing 221 can provide protection for the optical fiber 222 prior to and during coupling of an adapter (e.g., adapters 130a, 130b illustrated in FIG. 1) to the insert 224. In one aspect, the casing 221 can form an integral unitary component of the insert 224. In another aspect, a casing can be a separate component of the insert. For example, the insert can comprise multiple components, for example, a main body portion and a separate casing. In a particular embodiment, the casing can be disposed inside the main body portion. In any event, the casing can be configured to extend anywhere from partially through the main body portion to beyond the main body portion, such that a portion of the casing is exposed on either end of the main body portion. In addition, the casing and the main body portion can be permanently attached to one another, such as by a braze, a weld, an adhesive, etc. In a particular aspect, a transition surface, similar to those as discussed above, can be formed by the application of at least one of a braze, a weld, and an adhesive permanently attaching a casing of the insert to a main body portion of the insert.

Figure 4A:
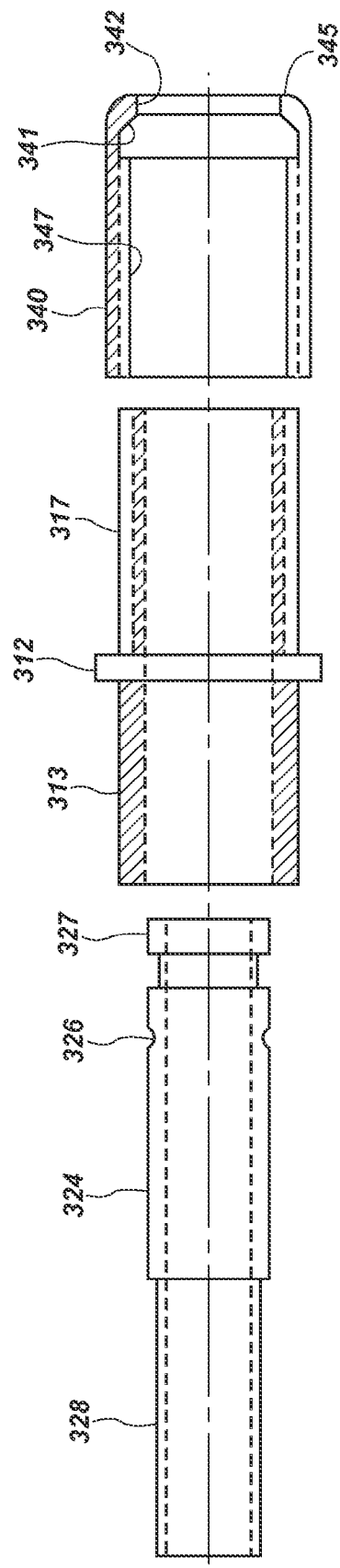
FIG. 4A is an example illustration of an exploded view of components of a repairable fiber optic cable in accordance with another embodiment of the present invention.
Figure 4B:
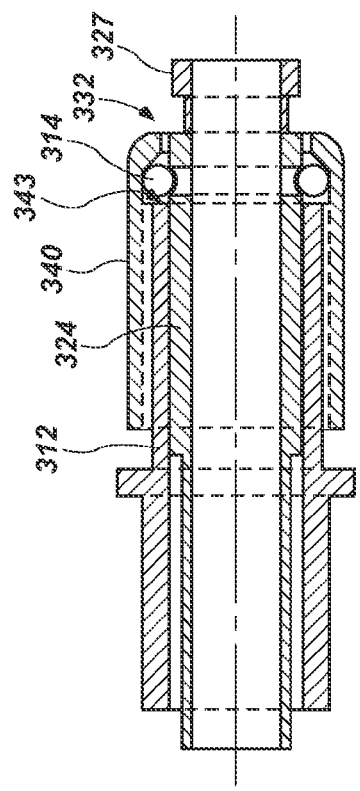
FIG. 4B is an example illustration of an assembled view of the components of the repairable fiber optic cable of FIG. 4A.

FIGS. 4A and 4B illustrate other embodiments of components of a repairable fiber optic cable. For example, an insert 324 can be coupled to or otherwise supported about an end of an optical fiber, as described herein. Additionally, a connector 312 can be associated with an outer protective housing, as described herein. In one aspect, to facilitate coupling with the outer protective housing, the connector 312 can include a flange 313 that can be inserted into the outer protective housing. The insert 324 can also include a flange 328 to interface with a strain relief component, as described herein, that can be disposed over a junction between an optical fiber and the insert 324. The strain relief component can also function to couple the insert 324 to the optical fiber.

Of particular interest in FIGS. 4A and 4B are the attachment features that facilitate removable coupling of the insert 324 and the connector 312. For example, the insert 324 can include a recess or groove 326 configured to interface with an o-ring 314 or other seal. The o-ring 314 can be disposed in the recess 326 once the insert 324 is disposed in the connector 312, with the recess 326 exposed to receive the o-ring 314. A cap 340 can be configured to couple with the connector 312, such as via threads 347 on the cap 340 and threads 317 on the connector 312. The cap 340 can also include an o-ring interface 341 to contact and engage the o-ring 314. With the o-ring 314 disposed in the recess 326, the cap 340 can be coupled to the connector 312, which can bring the o-ring interface 341 into contact with the o-ring 314. The o-ring interface 341 can be angled, such as at a 45 degree angle. Thus, when the cap 340 is secured to the connector 312, the o-ring interface 341 can maintain the o-ring 314 in the insert recess 326, which can serve to lock the insert 324 in place relative to the connector 312. The respective attachment features of the connector 312, insert 324, and cap 340 can therefore be configured to operate together to secure the insert to the connector.

The o-ring interface 341 can also compress the o-ring 314 into the connector 312 and insert 324 to cover an end or opening 343 of a gap or space that may exist between the connector 312 and the insert 324. The o-ring 341 can therefore serve not only to couple the insert 324 to the connector 312, but also to seal the interior of an outer protective housing via the opening 343 of a gap between the insert 324 and the connector 312.

One benefit of such a seal is that the interior of the outer protective housing is isolated from the exterior of the outer protective housing. A pathogen located in the interior of the outer protective housing is therefore prevented from escaping. This can be useful because, in many situations, it can be desirable to sterilize the fiber optic cable. A sealed outer protective housing allows for replacement of a fiber optic core in a clean but non-sterile environment. With ends sealed by o-rings, no pathogens can enter the outer protective housing around the fiber optic core or escape from the region between the fiber optic core and the outer protective housing. The exterior of the assembled fiber optic cable can then be sterilized without concerns that a pathogen could migrate out of, or into, the fiber optic cable.

The o-ring can be made of any suitable material, such as ethylene propylene, which has excellent properties in the presence of steam and the high temperatures required for sterilization. In one aspect, the cap can be tightened and/or loosened by hand, thus no tools are needed to replace a fiber optic core.

Additionally, a portion 327 of the insert 324 can be configured to couple with an adapter for a fiber optic device (not shown). In one aspect, the cap 340 can operate cooperatively with the insert 324 to form an interface 332 for an adapter for coupling to an optical device. For example, a portion of the insert 324 can extend through cap opening 342 and beyond the end 345 of the cap 340 to expose an adapter interface feature for coupling with the adapter. In particular, a portion of the insert 312 can comprise a threaded interface 327 configured to couple with an adapter for a fiber optical device. In addition, upon threading the adapter to the insert 324, the adapter can be configured to contact the end 345 of the cap 340. The recess 326 can also function to properly position the insert 324 in relation to the cap 340 so that the insert 324 is in the proper position to couple with or accommodate a light source or instrument adaptor.

A fiber optic cable repair kit can is further contemplated herein. In one exemplary embodiment, the repair kit can include a replacement fiber optic core, as disclosed herein, and a coupling device coupleable to an insert of the replacement fiber optic core. The coupling device can be operable to couple an end of the replacement fiber optic core to an end of an existing fiber optic core (e.g., a broken replacement fiber optic core) disposed in an outer protective housing of a repairable fiber optic cable. With ends of the two fiber optic cores coupled together, the coupling device can facilitate insertion of the replacement fiber optic core in the protective housing while removing the existing fiber optic core from the protective housing. In one aspect, the coupling device can comprise an elastic tube, such as a silicone tube, configured to fit over an insert and slide through a connector of an outer protective housing. The repair kit can be provided with the coupling device already disposed on an end of the replacement fiber optic core. The repair kit can also include at least one of a set screw, a pin, and a key insert to facilitate removable coupling of the insert with a connector associated with the outer protective housing. This can be provided as a replacement part for a damaged or lost part of the fiber optic cable being repaired. Similarly, any part or component of a repairable fiber optic cable can be replaced when damaged. In essence, the repair kit enables an end user to couple an end of a first fiber optic core to an end of a replaceable second fiber optic core disposed in an outer protective housing to facilitate insertion of the first fiber optic core in the outer protective housing while removing the second fiber optic core from the outer protective housing, thus repairing an existing optical fiber cable.

In accordance with one embodiment of the present invention, a method of repairing a fiber optic cable is disclosed. The method can comprise uncoupling an insert of a first fiber optic core from a connector associated with an outer protective housing. The method can also comprise removing the first fiber optic core from the outer protective housing. The method can further comprise disposing a second fiber optic core in the outer protective housing. Additionally, the method can comprise coupling an insert of the second fiber optic core to the connector.

In one aspect, the method can further comprise disposing a coupling device about an end of the second fiber optic core and disposing the coupling device about and end of the first fiber optic core. Removing the first fiber optic core from the outer protective housing can operate to simultaneously dispose the second fiber optic core in the outer protective housing.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method of repairing a fiber optic cable, comprising:
   uncoupling an insert of a first fiber optic core from a connector associated with an outer protective housing;
   disposing a coupling device about and end of the first fiber optic core;

disposing the coupling device about an end of a second fiber optic core;

removing the first fiber optic core from the outer protective housing;

disposing a second fiber optic core in the outer protective housing; and coupling an insert of the second fiber optic core to the connector;

wherein removing the first fiber optic core from the outer protective housing operates to simultaneously dispose the second fiber optic core in the outer protective housing.

2. The method of claim 1, further comprising:

uncoupling a second insert of the first fiber optic core from a second connector associated with the outer protective housing.

3. The method of claim 2, wherein uncoupling the second insert of the first fiber optic core from the second connector associated with the outer protective housing comprises disengaging an attachment feature of the second connector from an attachment feature of the second insert.

4. The method of claim 1, further comprising:

coupling a second insert of the second fiber optic core to a second connector associated with the outer protective housing.

5. The method of claim 4, wherein coupling the second insert of the second fiber optic core to the second connecter of the outer protective housing comprises engaging an attachment feature of the second connector with an attachment feature of the second insert.

6. The method of claim 1, wherein uncoupling the insert of the first fiber optic core from the connector comprises disengaging an attachment feature of the connector from an attachment feature of the insert.

7. The method of claim 1, wherein coupling the connector of the second fiber optic core to the insert further comprises engaging an attachment feature of the connector with an attachment feature of the insert.

8. The method of claim 1, wherein the fiber optic core comprises a plurality of optical fibers.

9. The method of claim 1, wherein the fiber optic core further comprises a protective sleeve disposed over the optical fiber.

10. The method of claim 9, wherein the protective sleeve comprises a mesh configuration.

11. The method of claim 1, wherein the fiber optic core further comprises a strain relief component disposed over a junction between the an optical fiber portion of the core and the insert.

12. The method of claim 1, wherein the insert is permanently attached to the optical fiber.

13. The method of claim 1, wherein a portion of the insert is configured to couple with an adapter for a fiber optic device.

14. The method of claim 1, wherein the insert comprises a casing disposed about an end of the optical fiber.

15. The method of claim 14, wherein the insert comprises a main body portion and the casing is disposed inside the main body portion.

16. The method core of claim 15, wherein the casing and the main body portion are permanently attached to one another with at least one of a braze, a weld, and an adhesive.

17. The method of claim 14, wherein an end of the insert comprises a transition surface that operates to ease insertion into, or removal from, the outer protective housing.

18. The method of claim 17, wherein the transition surface is formed by at least one of a braze, a weld, and an adhesive permanently attaching a casing of the insert to a main body portion of the insert.

* * * * *